United States Patent
Ohno et al.

(10) Patent No.: US 11,977,182 B2
(45) Date of Patent: May 7, 2024

(54) OPTICAL IMAGING APPARATUS, ROBOT HAND, MOVING BODY, AND LiDAR APPARATUS

(71) Applicant: KABUSHIKI KAISHA TOSHIBA, Tokyo (JP)

(72) Inventors: Hiroshi Ohno, Tokyo (JP); Hiroya Kano, Kawasaki Kanagawa (JP); Hideaki Okano, Yokohama Kanagawa (JP); Takahiro Kamikawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 509 days.

(21) Appl. No.: 16/804,259

(22) Filed: Feb. 28, 2020

(65) Prior Publication Data
US 2021/0080543 A1     Mar. 18, 2021

(30) Foreign Application Priority Data

Sep. 18, 2019  (JP) .................................. 2019-168959

(51) Int. Cl.
| | | |
|---|---|---|
| G01S 7/481 | (2006.01) | |
| G01S 17/89 | (2020.01) | |
| G02B 5/30 | (2006.01) | |

(52) U.S. Cl.
CPC .............. *G01S 7/481* (2013.01); *G01S 17/89* (2013.01); *G02B 5/3025* (2013.01)

(58) Field of Classification Search
CPC ........ G01S 7/481; G01S 17/89; G02B 5/3025
See application file for complete search history.

(56) References Cited

U.S. PATENT DOCUMENTS 3,501,229 A * 3/1970 Dejoux .................. G03B 35/26
                                                           352/41
5,959,425 A * 9/1999 Bieman .............. G05B 19/4207
                                                        318/568.15
(Continued)

FOREIGN PATENT DOCUMENTS

| EP | 2 136 198 A1 | 12/2009 |
|---|---|---|
| JP | 2003-339060 | 11/2003 |

(Continued)

OTHER PUBLICATIONS

Ohno, "Multi-angle-view monocular camera using a polarization image sensor," Applied Optics, vol. 58, No. 15, pp. 4036-4041 (May 17, 2019).

*Primary Examiner* — Minh Q Phan
(74) *Attorney, Agent, or Firm* — Finnegan, Henderson, Farabow, Garrett & Dunner, LLP

(57) ABSTRACT

According to one embodiment, an optical imaging apparatus includes a polarizer assembly, a polarization image sensor, and a lens assembly. The polarizer assembly is configured to acquire a first light ray of a first polarization component and a second light ray of a second polarization component which is different from the first polarization component, by using a light flux from an identical direction. The polarization image sensor is located in a position facing the polarizer assembly. The polarization image sensor is configured to acquire an image of the first polarization component and an image of the second polarization component at once or at the same time. The lens assembly includes a first lens configured to form the images on the polarization image sensor.

14 Claims, 14 Drawing Sheets

(56) References Cited

U.S. PATENT DOCUMENTS

| | | |
|---|---|---|
| 2012/0105598 A1 | 5/2012 | Hiramoto et al. |
| 2012/0212587 A1 | 8/2012 | Otani |
| 2012/0300033 A1 | 11/2012 | Singh et al. |
| 2013/0307804 A1 | 11/2013 | Adachi et al. |
| 2014/0055664 A1 | 2/2014 | Yamagata et al. |
| 2015/0212294 A1 | 7/2015 | Imamura et al. |
| 2017/0091568 A1* | 3/2017 | Hama .................... G06V 10/42 |
| 2018/0176454 A1* | 6/2018 | Omata ............. H04N 5/232127 |
| 2020/0288058 A1 | 9/2020 | Ohno et al. |

FOREIGN PATENT DOCUMENTS

| | | |
|---|---|---|
| JP | 2011-215545 A | 10/2011 |
| JP | 2011-239241 A | 11/2011 |
| JP | 2012-170026 A | 9/2012 |
| JP | 2016-54487 A | 4/2016 |
| JP | 2020-144323 A | 9/2020 |
| WO | WO 2012/105157 A1 | 8/2012 |
| WO | WO 2012/105158 A1 | 8/2012 |
| WO | WO 2013/114888 A1 | 8/2013 |
| WO | WO 2015/015717 A1 | 2/2015 |

* cited by examiner

OPTICAL IMAGING APPARATUS, ROBOT HAND, MOVING BODY, AND LiDAR APPARATUS

CROSS REFERENCE TO RELATED APPLICATION

This application is based upon and claims the benefit of priority from prior Japanese Patent Application No. 2019-168959, filed Sep. 18, 2019, the entire contents of which are incorporated herein by reference.

FIELD

Embodiments described herein relate generally to an optical imaging apparatus, a robot hand, a moving body and a LiDAR apparatus.

BACKGROUND

When a plurality of images are simultaneously captured, a plurality of cameras are used.

DETAILED DESCRIPTION

Hereinafter, an optical imaging apparatus 10 will be described with reference to the accompanying drawings. The drawings are schematic or conceptual ones.

The technical problem to be solved by the embodiments is to provide an optical imaging apparatus which can easily acquire a plurality of images at once or at the same time.

According to one embodiment, an optical imaging apparatus includes a polarizer assembly, a polarization image sensor, and a lens assembly. The polarizer assembly is configured to acquire a first light ray of a first polarization component and a second light ray of a second polarization component which is different from the first polarization component, by using a light flux from an identical direction. The polarization image sensor is located in a position facing the polarizer assembly. The polarization image sensor is configured to acquire an image of the first polarization component and an image of the second polarization component at once or at the same time. The lens assembly includes a first lens configured to form the images on the polarization image sensor.

First Embodiment

Figure 1:
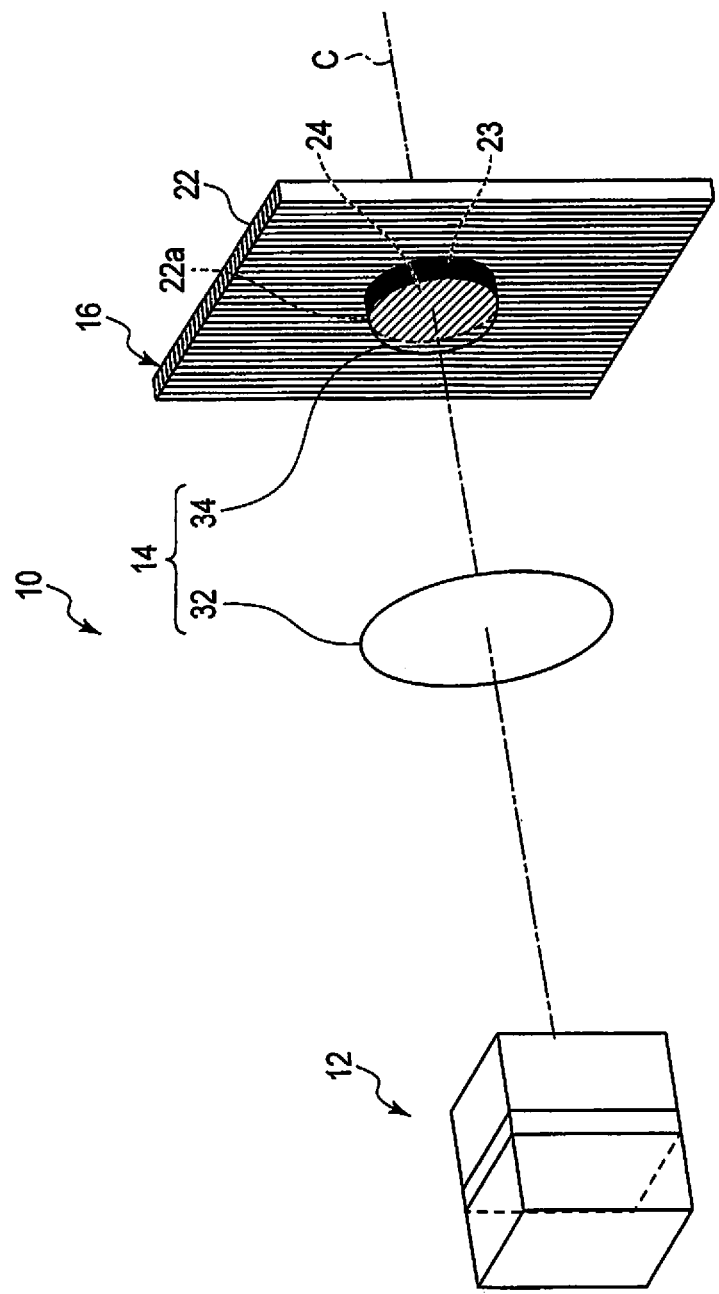
FIG. 1 is a schematic perspective view illustrating an optical imaging apparatus according to a first embodiment.

As illustrated in FIG. 1, the optical imaging apparatus 10 according to the present embodiment includes a polarization image sensor (polarization camera) 12, a lens assembly 14, and a polarizer assembly 16. In this embodiment, the polarization image sensor 12, lens assembly 14 and polarizer assembly 16 have an identical optical axis C.

The polarization image sensor 12 is located in a position facing the polarizer assembly 16. The polarization image sensor 12 can acquire a plurality of (two or more) different polarization components by respective pixels. For example, the polarization image sensor 12 can acquire image data of polarization components by using a set of polarizers of four directions of polarization axes (polarization angles) of 0°, 45°, 90°, and 135° at once or at the same time. In the present embodiment, as will be described later, the polarization image sensor 12 can acquire an image of a first polarization component of 0°, and an image of a second polarization component of 90° in each set of polarizers.

It is preferable that the polarization image sensor 12 includes, for example, several-million effective pixels. As an example of the polarization image sensor 12, IMX250MZR manufactured by Sony Corporation is used.

The polarizer assembly 16 can acquire a first light ray B1 of a first polarization component and a second light ray B2 of a second polarization component that is different from the first polarization component, by using a light flux from an identical direction.

The polarizer assembly 16 includes a first polarizing optical element 22 having a circular opening edge 22a, and a second polarizing optical element 24 located inside the opening edge 22a of the first polarizing optical element 22. Specifically, the second polarizing optical element 24 is disposed in the inside of the first polarizing optical element 22. The center axis of the second polarizing optical element 24 agrees with the optical axis C. The first polarizing optical element 22 and second polarizing optical element 24 neighbor each other in a radial direction with respect to the optical axis C. The first polarizing optical element 22 and second polarizing optical element 24 have plate shapes. The thickness of each of the first polarizing optical element 22 and second polarizing optical element 24 is, for example, 1 mm or less. For example, the outer shape of the first polarizing optical element 22 is substantially rectangular. The outer shape of the first polarizing optical element 22 may be set as appropriate, such as a circular shape or the like. The outer shape of the second polarizing optical element 24 is discoidal. In the present embodiment, the area of the first polarizing optical element 22 is greater than the area of the second polarizing optical element 24.

The polarizer assembly 16 includes the first polarizing optical element 22 and second polarizing optical element 24, and the entirety of the polarizer assembly 16 may be formed in an appropriate shape, such as a cubic shape or the like.

An annular shield portion 23 is disposed between an outer peripheral surface 24a of the second polarizing optical element 24 and the opening edge 22a of the first polarizing optical element 22. The shield portion 23 is formed of, for example, a black rubber material or the like. Thus, a boundary is formed by the shield portion 23 between the first polarizing optical element 22 and second polarizing optical element 24. In the polarizer assembly 16, light is prevented from passing through the shield portion 23.

The first polarizing optical element 22 transmits, for example, linearly polarized light of a polarization axis of 0°, which is included in natural light (light including components oscillating in all directions of 360°) passing through the first polarizing optical element 22. The second polarizing optical element 24 transmits, for example, linearly polarized light of a polarization axis of 90°, which is included in natural light (light including components oscillating in all directions of 360°) passing through the second polarizing optical element 24.

In the present embodiment, the lens assembly 14 is located between the polarization image sensor 12 and polarizer assembly 16. The lens assembly 14 includes a first lens 32 and a second lens 34. The first lens 32 is opposed to the polarization image sensor 12. The polarization image sensor 12 is located at a position of a focal distance (focal plane) f of the first lens 32. The first lens 32 forms appropriate images on the polarization image sensor 12. The second lens 34 is located between the first lens 32 and the second polarizing optical element 24. The second lens 34 refracts the second light ray B2 of the second polarization component, which passes through the second polarizing optical element 24, and makes the second light ray B2 incident on the first lens 32.

The center axes of the first lens 32 and second lens 34 agree with the optical axis C. The outside diameter of the first lens 32 is greater than the outside diameter of the second lens 34. The outside diameter of the second lens 34 is equal to or slightly greater than the outside diameter of the second polarizing optical element 24. The outside diameter of the second lens 34 is less than the inside diameter of the opening edge 22a of the first polarizing optical element 22.

One or more processing circuits of the optical imaging apparatus 10 are configured to acquire images of two or more view fields by executing a predetermined arithmetic operation on data of the first polarization component and second polarization component acquired by the polarization image sensor 12. The predetermined arithmetic operation is, for example, an inverse matrix arithmetic operation in which image data of images, in which intensities of light rays from the two or more view fields are taken into account, is calculated based on the intensity data of the first polarization component and second polarization component acquired by the polarization image sensor 12.

The processing circuit (controller) of the optical imaging apparatus 10 is, for example, an integrated circuit such as a Central Processing Unit (CPU) or Application Specific Integrated Circuit (ASIC). As the processing circuit, a general-purpose computer may be used. Aside from the case in which the processing circuit is provided as a dedicated circuit, the processing circuit may be provided as a program that is executed by a computer. In this case, the program is stored in a memory area in an integrated circuit, a memory, or the like. The processing circuit is connected to the polarization image sensor 12 and the memory. The processing circuit acquires acquisition data by the polarization image sensor 12, executes an arithmetic operation of multiplying a proper coefficient or the like, based on this acquisition data, and calculates image data of the acquisition data.

Here, it is assumed that the intensities of the polarization components, which are acquired by the polarization image sensor 12 by grouping four pixels as one set, are $I_0$, $I_{45}$, $I_{90}$, and $I_{135}$. The processing circuit acquires, from the polarization image sensor 12, the intensities $I_0$, $I_{45}$, $I_{90}$, and $I_{135}$ of the polarization components acquired by the polarization image sensor 12. Here, subscripts represent the angles of polarization.

The processing circuit can acquire the acquisition data by the polarization image sensor 12. The processing circuit can generate image data, based on the acquisition data of each polarization component, which is acquired by the polarization image sensor 12. The processing circuit can output to, for example, a display the image data of each polarization component, which is acquired by the polarization image sensor 12, and can cause the display to display the image data.

It is assumed that intensities of light rays at object points P1, P2 (, P3) (to be described later) are $S_1$, $S_2$, and $(S_3)$. These satisfy the following relationship:

$$\begin{bmatrix} I_0 \\ I_{45} \\ I_{90} \\ I_{135} \end{bmatrix} = \begin{bmatrix} A & B & C & 0 \\ D & E & F & 0 \\ G & H & I & 0 \\ 0 & 0 & 0 & 1 \end{bmatrix} \begin{bmatrix} S_1 \\ S_2 \\ S_3 \\ I_0 + I_{45} - I_{90} \end{bmatrix} \quad (1)$$

By performing an inverse matrix arithmetic operation, the following is obtained:

$$\begin{bmatrix} S_1 \\ S_2 \\ S_3 \end{bmatrix} = \begin{bmatrix} A & B & C \\ D & E & F \\ G & H & I \end{bmatrix}^{-1} \begin{bmatrix} I_0 \\ I_{45} \\ I_{90} \end{bmatrix} \quad (2)$$

Specifically, based on signals (data $I_0$, $I_{45}$, $I_{90}$ indicative of intensities of respective polarization components) acquired by the polarization image sensor 12, image data $S_1$, $S_2$, and $S_3$ of the object points P1, P2 (, P3), in which the original intensities of light rays from the object points P1, P2 (, P3) are taken into account, can be calculated. Thereby, the optical imaging apparatus 10 can acquire the image data $S_1$, $S_2$, and $S_3$ of the object points P1, P2 (, P3) in accordance with the intensities of light at the object points P1, P2 (, P3).

The above-described equation (2) is stored in the memory. The memory stores, for example, an output (image data, etc.) of the processing circuit. The memory may store an output (acquisition data) of the polarization image sensor 12. Although the memory is, for example, a nonvolatile memory such as a flash memory, the memory may be a storage device such as a Hard Disk Drive (HDD), a Solid State Drive (SSD) or an integrated circuit memory device, or may further include a volatile memory.

An operation of the optical imaging apparatus 10 according to the present embodiment will be described.

Figure 2:
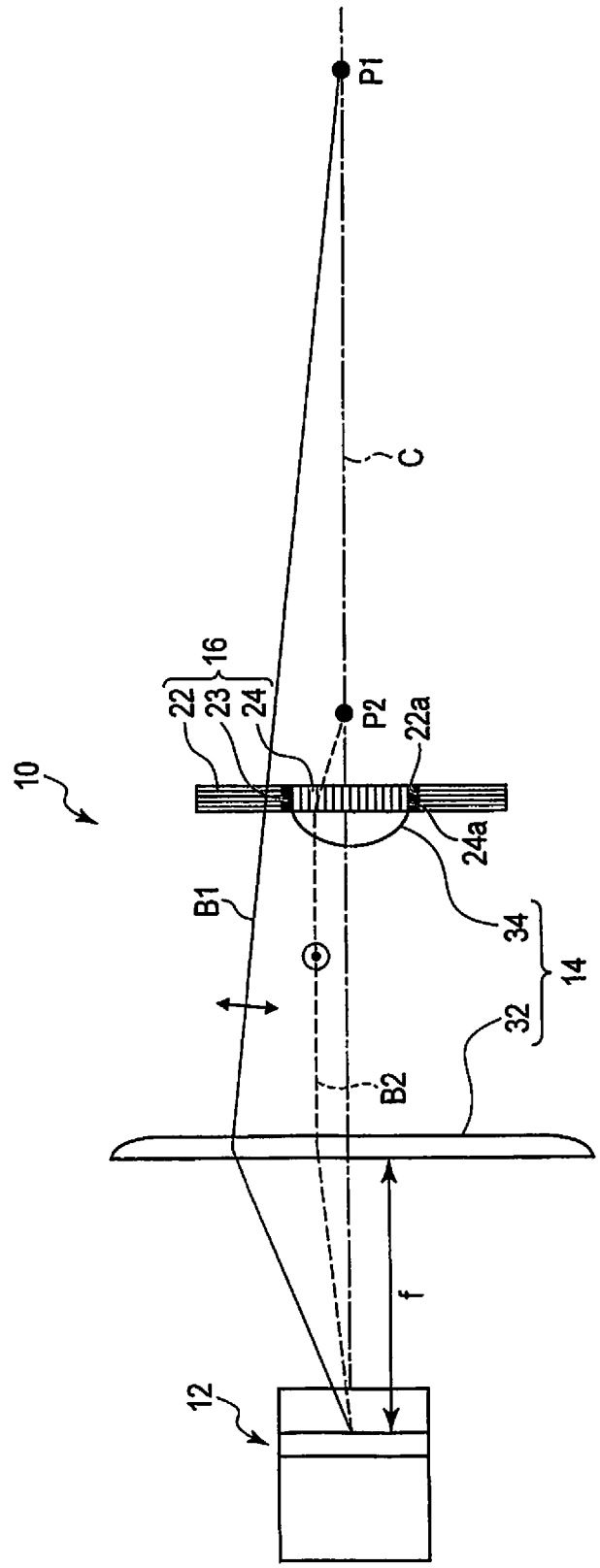
FIG. 2 is a schematic side view illustrating the optical imaging apparatus of FIG. 1.

The first polarizing optical element 22 illustrated in FIG. 2 obtains a first light ray B1 which is polarized in a direction of a first polarization axis (e.g. 0°), from light rays (natural light) emanating from a first object point P1 which is located on a side opposite to the polarization image sensor 12. The first light ray B1 passes through the first lens 32 and forms an image on the polarization image sensor 12.

The second polarizing optical element 24 obtains a second light ray B2 which is polarized in a direction of a second polarization axis (e.g. 90°), from light rays (natural light) emanating from a second object point P2 which is located on the side opposite to the polarization image sensor 12. The second light ray B2 passes through the second lens 34 and first lens 32, or, in other words, is refracted twice, and forms an image on the polarization image sensor 12.

The light ray emanating from the first object point P1 and the light ray emanating from the second object point P2 are light (light flux) from the same direction (same axis) with respect to the optical imaging apparatus 10.

The polarization image sensor 12 captures images at respective pixels by grouping polarized light rays of polarization axes of 0°, 45°, 90° and 135° as one set. Specifically, the polarization image sensor 12 acquires images of polarized light rays of polarization axes of 0°, 45°, 90° and 135°, by grouping four pixels as one set. The polarization image sensor 12 can simultaneously acquire, as independent images, an image which passes through the first polarizing optical element 22 of the polarization axis of 0°, and an image which passes through the second polarizing optical element 24 of the polarization axis of 90°. Actually, the polarization image sensor 2 can obtain four images corresponding to the polarization axes of 0°, 45°, 90° and 135°. Here, two images of the polarization axes of 0° and 90° are used.

The first object point P1 is located on a far-side with respect to the optical imaging apparatus 10, and the second object point P2 is located on a near-side with respect to the optical imaging apparatus 10. By imaging the first polarization component of 0° by the polarization image sensor 12, the first object point P1 can be focused and a far-side from the first object point P1 can be observed. By imaging the second polarization component of 90° by the polarization image sensor 12, the second object point P2, which is located on the near-side with respect to the first object point P1, can be focused and a far-side from the second object point P2 can be observed.

A first image, which is formed on the polarization image sensor 12 after passing through the first polarizing optical element 22 and first lens 32 from the first object point P1, is formed on the polarization image sensor 12 after being once refracted by the first lens 32. A second image, which is formed on the polarization image sensor 12 after passing through the second polarizing optical element 24, first lens 32 and second lens 34 from the second object point P2, is formed on the polarization image sensor 12 after being twice refracted by the second lens 34 and first lens 32. Thus, the first image and second image are images with different magnifications. Accordingly, the optical imaging apparatus 10 can acquire, from the same position toward the same direction, images of different magnifications at the same time or at once. Specifically, the polarization image sensor 12 can simultaneously acquire images of two view fields of the light (light flux) from the same direction, with the viewing angles of the first image of the first object point P1 and the second image of the second object point P2 being different from each other.

In this manner, the polarization image sensor 12 can simultaneously acquire images of different positions on the same optical axis C. At this time, by using a single polarization image sensor 12, the optical imaging apparatus 10 according to the present embodiment is not required to use a plurality of cameras even when a plurality of images are acquired at the same time or at once, and there is no need to perform synchronization adjustment.

According to the present embodiment, there can be provided an optical imaging apparatus 10 which can easily acquire a plurality of images at the same time or at once. According to this embodiment, there can be provided an optical imaging apparatus 10 which can acquire a plurality of images at the same time or at once by using a light flux from the same direction. According to this embodiment, there can be provided an optical imaging apparatus 10 which can acquire images of different positions on the same optical axis C at the same time or at once.

By using mutually different polarization degrees (0°, 90°), the optical imaging apparatus 10 can recognize an adjacent object, for example, regardless of whether the adjacent object is a metallic body of a different kind or a metallic body of an identical kind. Thus, by using the optical imaging apparatus 10, even in the case of an adjacent object of a metallic body of the identical kind and the identical color, a boundary or the like can easily be recognized. The same applies to second to seventh embodiments which will be described later.

In the present embodiment, the example was described in which two polarizing optical elements, namely the first polarizing optical element 22 and second polarizing optical element 24, are used as the polarizer assembly 16. The polarizer assembly 16 may use a third polarizing optical element of, for example, 45° or 135°, and thereby an additional image can be obtained. In this case, for example, a polarizing optical element of 45° or 135° may be concentrically disposed on the outer periphery of the first polarizing optical element 22 and second polarizing optical element 24.

Next, a purpose of use of the optical imaging apparatus 10 according to the first embodiment will be described with reference to FIG. 3.

Figure 3:
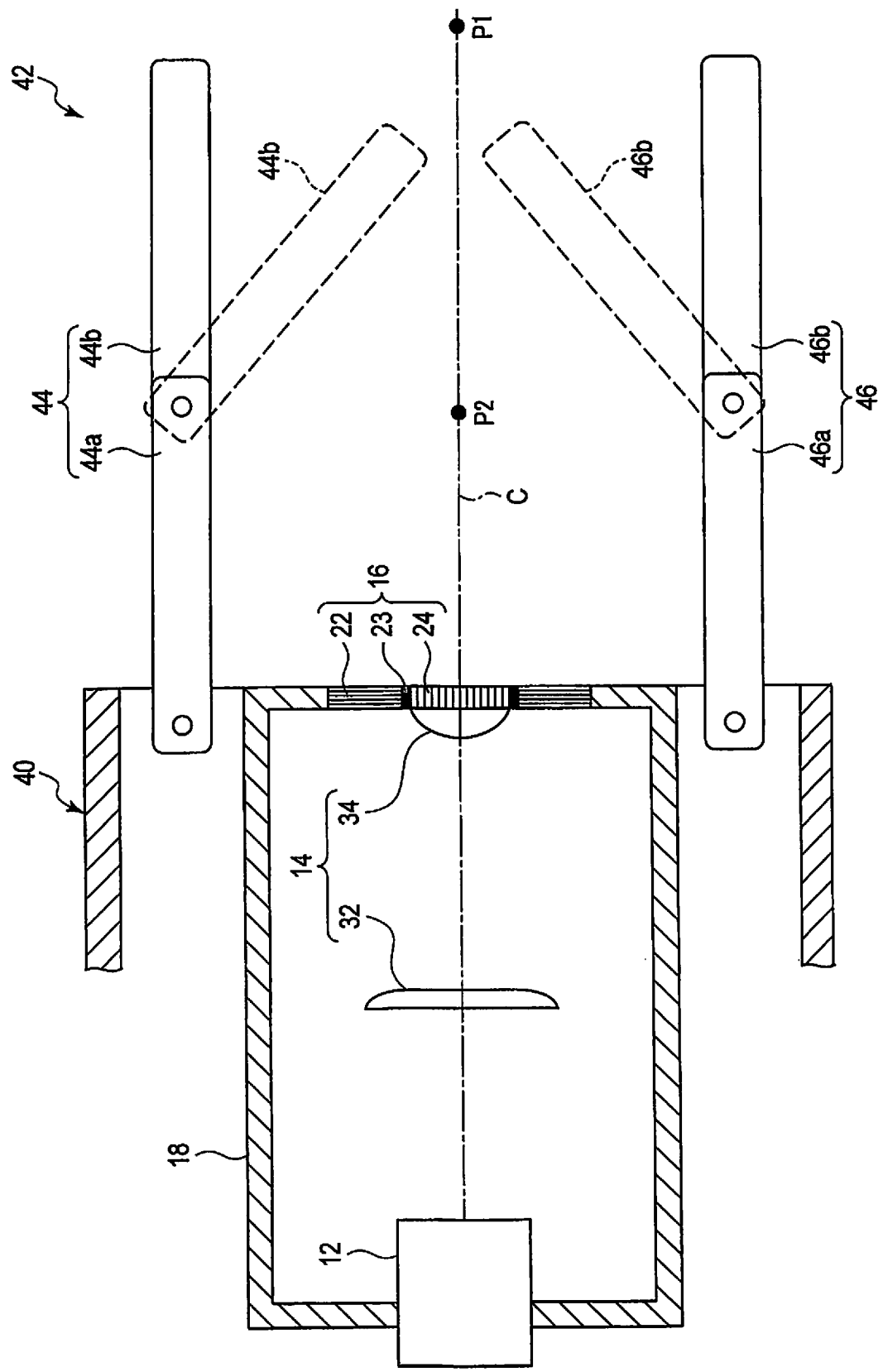
FIG. 3 is a schematic view illustrating a robot including a hand in which the optical imaging apparatus according to the first embodiment is assembled.

FIG. 3 illustrates a robot arm 40. The robot arm 40 includes a robot hand 42 at a tip end thereof. The optical imaging apparatus 10 is fixed to the tip end of the arm 40 via, for example, a housing 18.

The hand 42 includes a first hand element 44 and a second hand element 46. The first hand element 44 includes a first link 44a which is supported on the tip end of the arm 40, and a second link 44b which is supported on a tip end of the first link 44a. The first hand element 44 can move both the first link 44a and the second link 44b by controlling an appropriate motor, and can move one of the first link 44a and the second link 44b. The second hand element 46 includes a first link 46a which is supported on the tip end of the arm 40, and a second link 46b which is supported on a tip end of the first link 46a. The second hand element 46 can move both the first link 46a and the second link 46b by controlling an appropriate motor, and can move one of the first link 46a and the second link 46b. In FIG. 3, positions to which the second links 44b and 46b are moved are indicated by broken lines.

Here, a position at which the first polarization component can be imaged by the polarization image sensor 12 through the first polarizing optical element 22 and first lens 32, i.e. the first object point P1 at which focusing is effected, is located on a far-side, for example, with respect to a distal end of the hand 42. A position at which the second polarization component can be imaged by the polarization image sensor 12 through the second polarizing optical element 22, second lens 34 and first lens 32, i.e. the second object point P2 at which focusing is effected, is located on a near-side, for example, with respect to the distal end of the hand 42. Thus, for example, when an object is to be grasped by the hand 42 of the robot arm 40, the optical imaging apparatus 10 judges the object, based on the image of the first polarization component, until the object to be grasped approaches the hand 42. In the optical imaging apparatus 10, when the object to be grasped has come closer to the hand 42 than the appropriate distance (object point P1), the image of the first polarization component enters a blurring state. On the other hand, when the object to be grasped has come closer to the hand 42 than the appropriate distance (object point P1), the optical imaging apparatus 10 can judge the object, based on the image of the second polarization component.

Thus, when the object is to be held by the hand 42 of the robot arm 40, the object can properly be imaged without displacing the optical axis C. Therefore, the hand 42 can properly be moved in relation to the object.

Second Embodiment

A second embodiment will be described with reference to FIG. 4. The present embodiment is a modification of the first embodiment. The same members as those described in the first embodiment are denoted by like reference signs, and a detailed description thereof is omitted.

Figure 4:
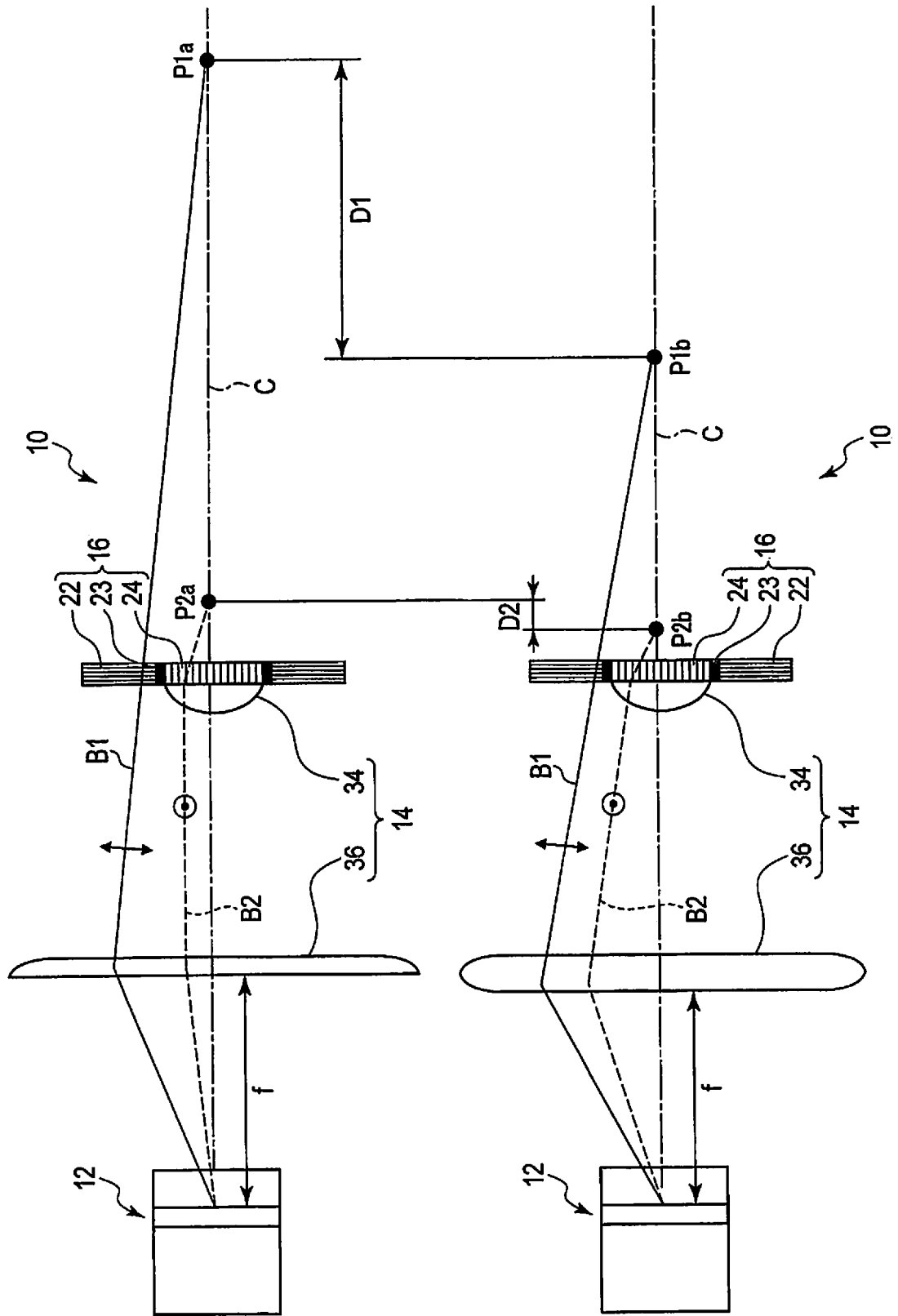
FIG. 4 is a schematic side view illustrating an optical imaging apparatus according to a second embodiment.

As illustrated in FIG. 4, a first lens 36 according to the present embodiment is a varifocal lens. As the varifocal lens, for example, a liquid lens is used.

An operation of the optical imaging apparatus 10 according to the present embodiment will be described.

An upper part of FIG. 4 is the same as FIG. 2 of the first embodiment. The polarization image sensor 12 can acquire an image of a first object point P1$a$ and an image of a second object point P2$a$.

In a lower part of FIG. 4, the first lens (varifocal lens) 36 is adjusted, compared to the upper part of FIG. 4, and the refractive index of the first lens 36 is increased. The first object point P1$a$ is shifted to a third object point P1$b$ by a distance D1 with respect to the optical imaging apparatus 10, and the second object point P2$a$ is shifted to a fourth object point P2$b$ by a distance D2 (<D1) with respect to the optical imaging apparatus 10.

In accordance with the performance of the first lens (varifocal lens) 3'6, an image of an object point (P1$b$) at a proper position between the first object point P1$a$ and second object point P2$a$ can be formed on the polarization image sensor 12. In accordance with the performance of the first lens (varifocal lens) 36, an image of an object point (P2$b$) at a proper position between the second object point P2$a$ and the polarizer assembly 16 can be formed on the polarization image sensor 12.

Thus, by using the varifocal lens as the first lens 36, the first lens 36 is properly operated, and the focal distance is varied. Thereby, compared to the example described in the first embodiment, the optical imaging apparatus 10 can obtain an image at a more appropriate, freely chosen position on the identical optical axis C.

By properly operating the first lens 36, images of a first area (e.g. an area between the object point P1$a$ and object point P1$b$ in FIG. 4) and a second area (e.g. an area between the object point P2$a$ and object point P2$b$ in FIG. 4), which are different areas along the optical axis C, can be formed on the polarization image sensor 12 by the light rays B1 and B2 of the first polarization component and second polarization components, and the images can be captured. In this case, by varying the first lens 36 at a proper speed, the first area and second area can be imaged. Thus, three-dimensional imaging of an object existing in an area including the first area and second area can be quickly performed.

The polarization image sensor 12 can acquire, for example, an image of a position farther than the object point P1$a$, as an image by the first polarization component. The polarization image sensor 12 can acquire, for example, an image of a position farther than the object point P2$a$, as an image by the second polarization component. Thus, the optical imaging apparatus 10 according to the present embodiment can acquire, by a single polarization image sensor 12, images of all areas along the optical axis C, which are farther than the object point P2$b$ that is closest to the optical imaging apparatus 10.

According to the present embodiment, there can be provided an optical imaging apparatus 10 which can easily acquire a plurality of images at the same time or at once. According to this embodiment, there can be provided an optical imaging apparatus 10 which can acquire a plurality of images at the same time or at once by using a light flux from the same direction. According to this embodiment, there can be provided an optical imaging apparatus 10 which can acquire images of different positions on the same optical axis C at the same time or at once.

Note that, in connection with third to fifth embodiments to be described later, the varifocal lens denoted by reference sign 36 can be used as needed in place of the first lens 32.

Next, a purpose of use of the optical imaging apparatus 10 according to the second embodiment will be described with reference to FIG. 5.

Figure 5:
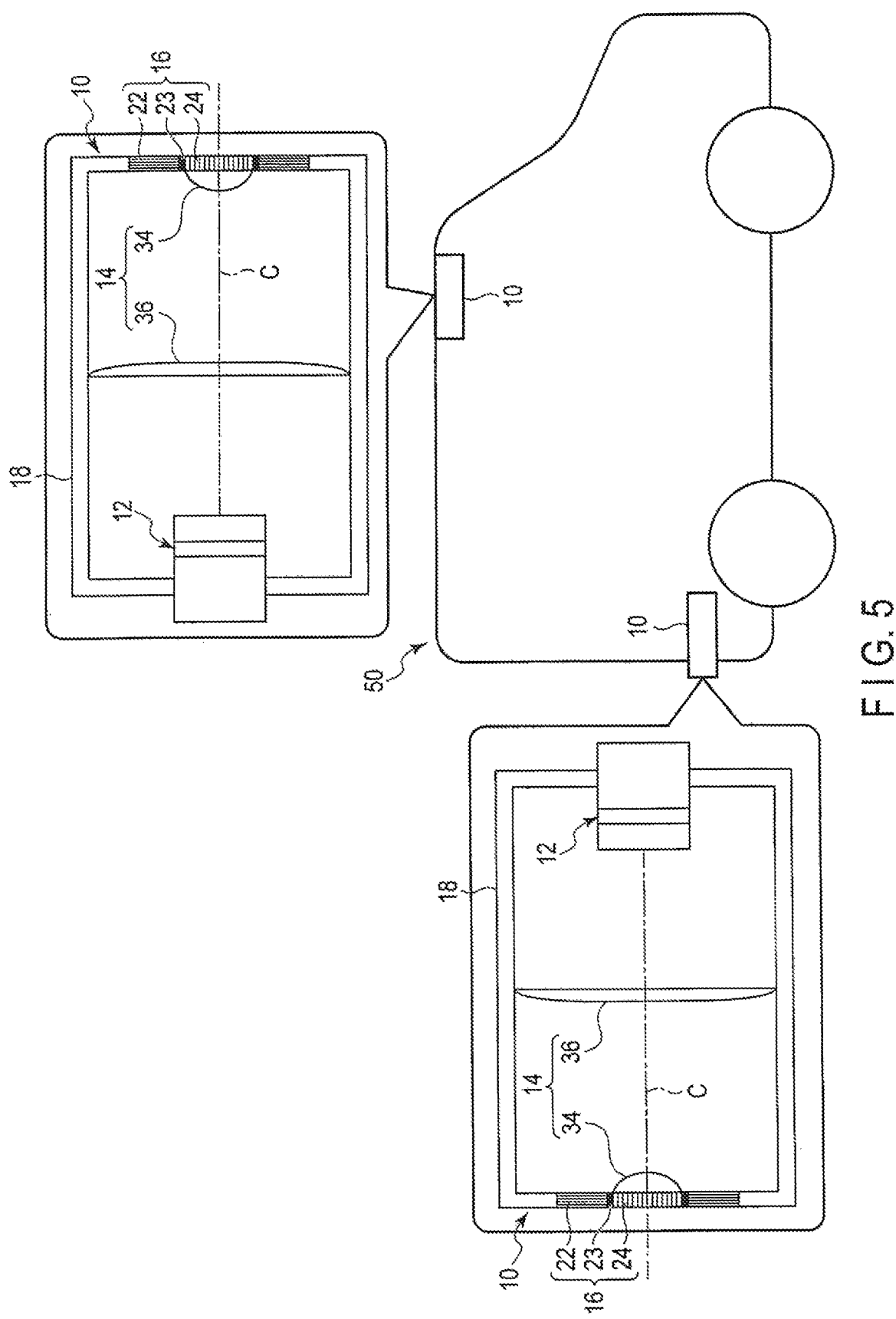
FIG. 5 is a schematic view illustrating an automobile (moving body) in which the optical imaging apparatus according to the second embodiment is assembled.

FIG. 5 illustrates an example of an automobile 50 as an example of a moving body. The automobile 50 includes an optical imaging apparatus 10, for example, at a ceiling or a windshield. The optical imaging apparatus 10 can observe a front side of the automobile 50. The automobile 50 includes another optical imaging apparatus 10, for example, near a rear door or a rear bumper. The optical imaging apparatus 10 can observe a rear side of the automobile 50.

In the automobile 50 illustrated in FIG. 5, not only the optical imaging apparatus 10 according to the second embodiment, but also optical imaging apparatuses 10 according to the first embodiment and third to seventh embodiments may be disposed as appropriate.

Next, another purpose of use of the optical imaging apparatus 10 according to the second embodiment will be described with reference to FIG. 6.

Figure 6:
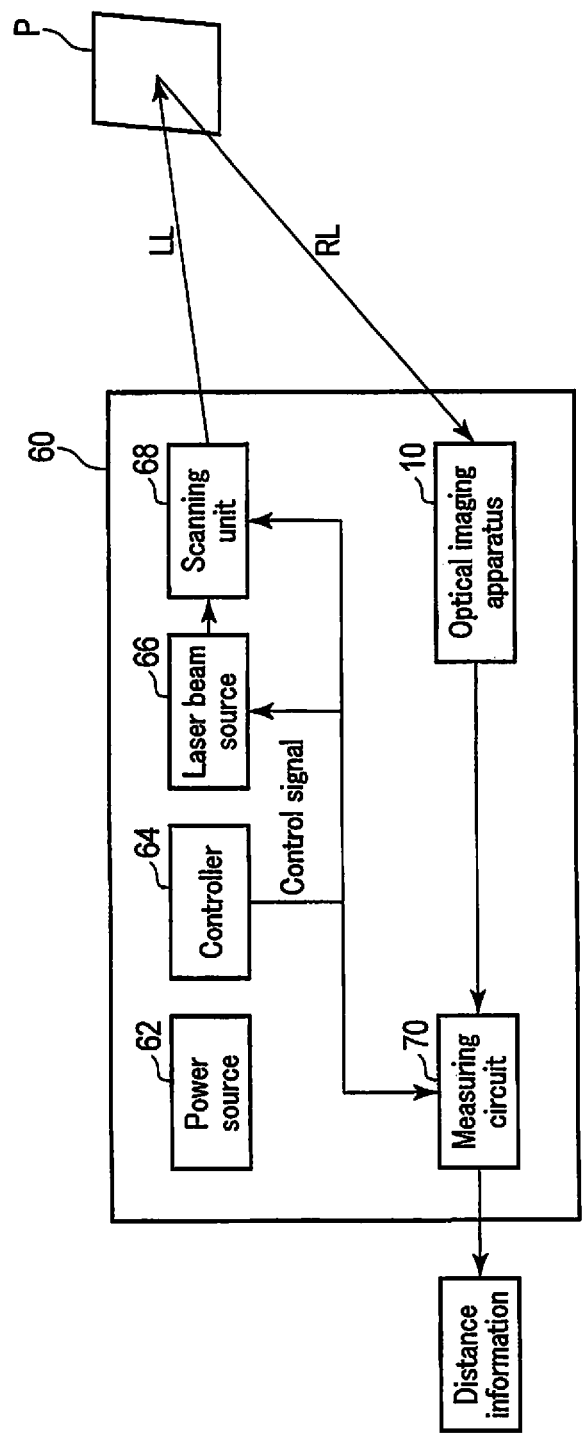
FIG. 6 is a schematic view illustrating a LiDAR apparatus in which the optical imaging apparatus according to the second embodiment is assembled.

FIG. 6 illustrates an example of a LiDAR apparatus 60. The LiDAR apparatus 60 includes, for example, a power source 2, a controller 64, a laser beam source 66, a scanning unit (scanner) 68, an optical imaging apparatus 10, and a measuring circuit 70. The LiDAR apparatus 60 obtains, by the optical imaging apparatus 10, reflective light RL from an object P by using a laser beam LL which is emitted from the laser beam source 66 in a pulse shape. Based on information acquired by the optical imaging apparatus 10, the measuring circuit 70 measures a time from the radiation of the laser beam to the return of the reflected laser beam, calculates a distance to the object, and outputs distance information.

In the LiDAR apparatus 60 illustrated in FIG. 6, not only the optical imaging apparatus 10 according to the second embodiment, but also optical imaging apparatuses 10 according to the first embodiment and third to seventh embodiments may be disposed as appropriate.

The LiDAR apparatus 60 illustrated in FIG. 6 may be disposed in a moving body such as the automobile 50, together with the optical imaging apparatus 10 illustrated in FIG. 5, or in place of the optical imaging apparatuses 10 illustrated in FIG. 5.

Third Embodiment

A third embodiment will be described with reference to FIG. 7. The present embodiment is a modification of the first embodiment and second embodiment. The same members as those described in the first embodiment and second embodiment are denoted by like reference signs, and a detailed description thereof is omitted.

Figure 7:
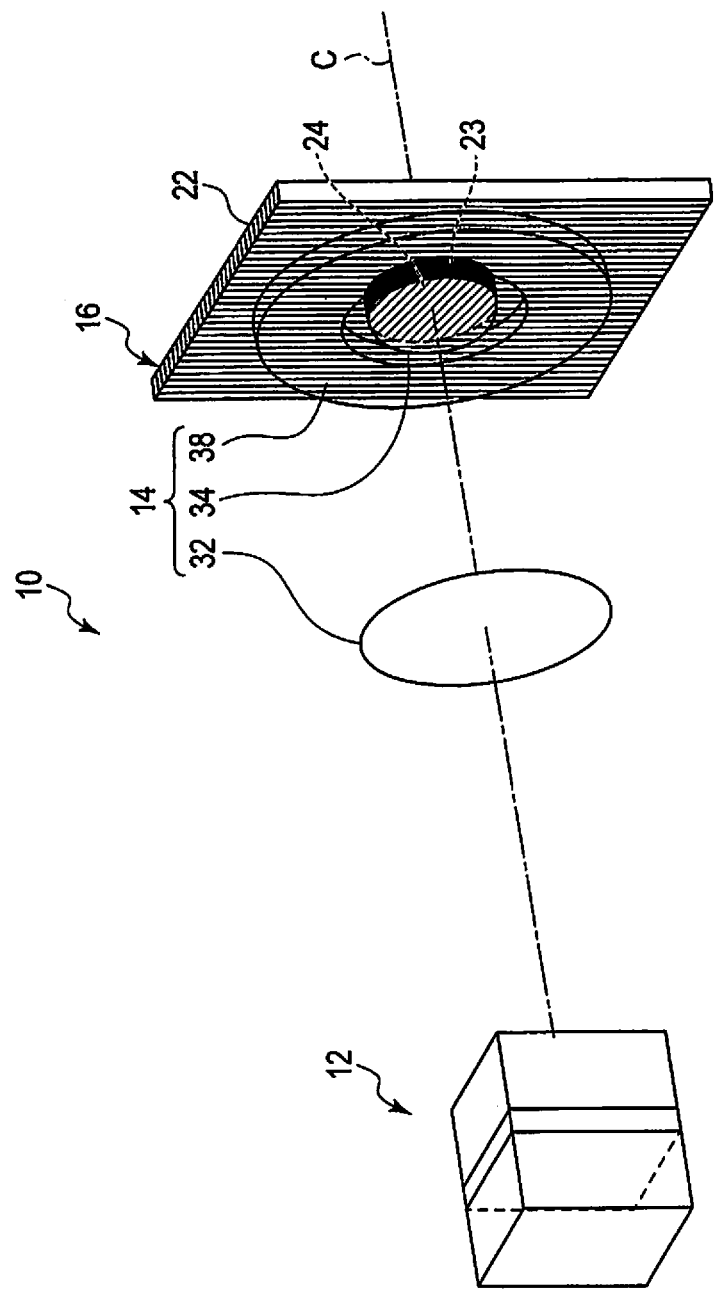
FIG. 7 is a schematic perspective view illustrating an optical imaging apparatus according to a third embodiment.

As illustrated in FIG. 7, the lens assembly 14 includes a third lens 38, in addition to the first lens 32 and second lens 34.

The third lens 38 is provided around the outer periphery of the second lens 34. Specifically, the third lens 38 has a through-hole in a central part thereof, such that the second lens 34 can pass through the through-hole. Thus, the third lens 38 has a substantially donut-like shape. As an example of the third lens 38, a Fresnel lens is used.

An inner periphery of the third lens 38 is fixed to the outer periphery of the second lens 34. An outer periphery of the third lens 38 may project to the outside of the first polarizing optical element 22. The third lens 38 changes an image formation position of the first light ray B1 with the first polarization of the first polarizing optical element 22 to a desired position.

According to the present embodiment, there can be provided an optical imaging apparatus 10 which can easily acquire a plurality of images at the same time or at once. According to this embodiment, there can be provided an optical imaging apparatus 10 which can acquire a plurality of images at the same time or at once by using a light flux from the same direction. According to this embodiment, there can be provided an optical imaging apparatus 10 which can acquire images of different positions on the same optical axis C at the same time or at once.

Fourth Embodiment

A fourth embodiment will be described with reference to FIG. 8 and FIG. 9. The present embodiment is a modification of the first to third embodiments. The same members as those described in the first to third embodiments are denoted by like reference signs, and a detailed description thereof is omitted.

Figure 8:
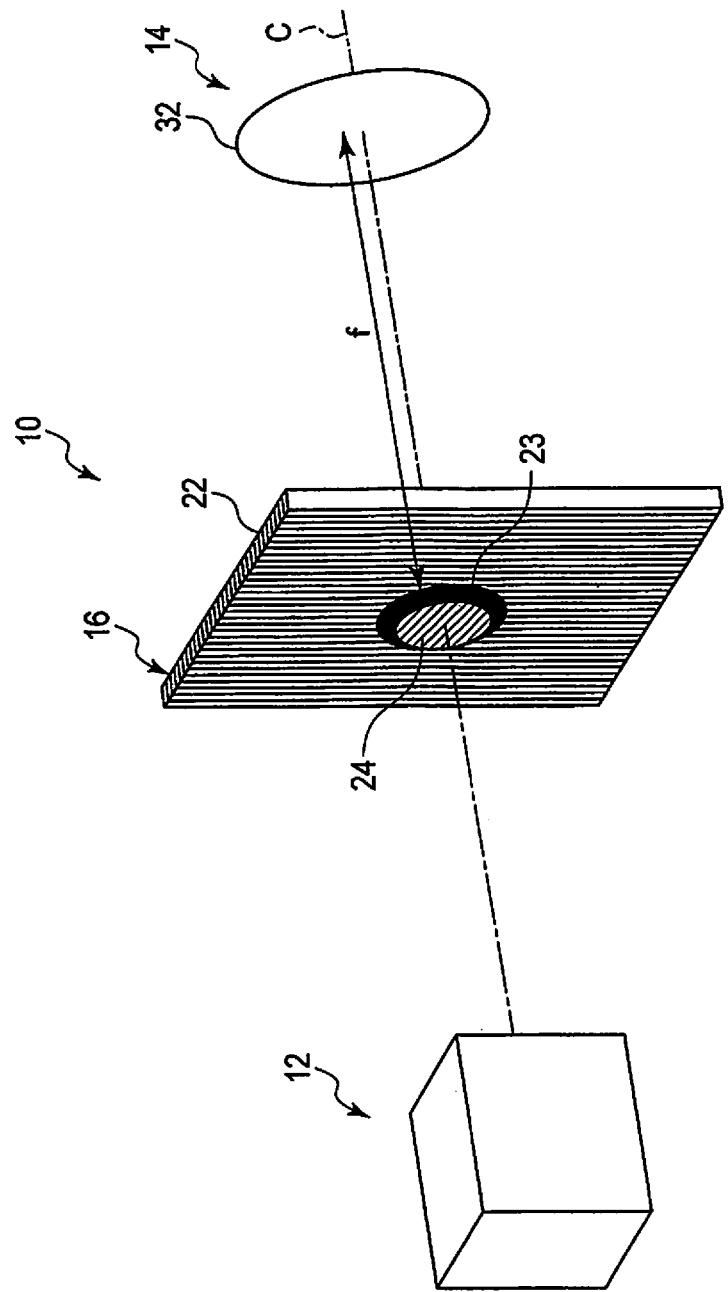
FIG. 8 is a schematic perspective view illustrating an optical imaging apparatus according to a fourth embodiment.
Figure 9:
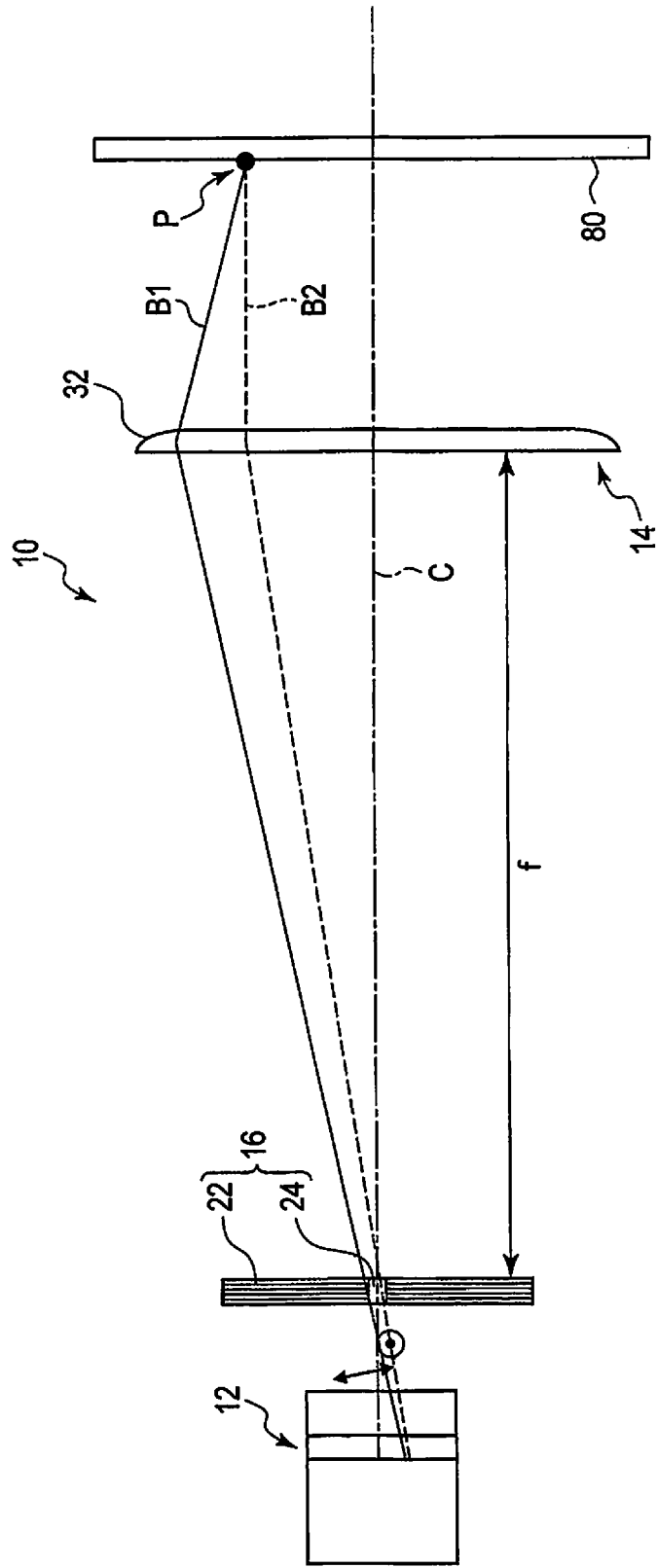
FIG. 9 is a schematic side view illustrating the optical imaging apparatus of FIG. 8.

As illustrated in FIG. 8 and FIG. 9, in the present embodiment, the polarizer assembly 16 is located between the polarization image sensor 12 and lens assembly 14.

In this embodiment, the lens assembly 14 includes one first lens 32. Specifically, the lens assembly 14 may not include a plurality of lenses, but may include one lens. The same applies to a fifth embodiment.

The polarizer assembly 16 illustrated in FIG. 9 is located at a position of the focal distance (focal plane) f of the first lens 32.

An operation of the optical imaging apparatus 10 according to the present embodiment will be described.

As illustrated in FIG. 9, an object 80 is disposed in an object plane of the first lens 32. It is assumed that, of the light rays emanating from an object point P of the object 80, a light ray (regular reflection light) which is parallel to the optical axis C of the first lens 32 is a second light ray B2. It is assumed that a light ray different from the second light ray B2 is a first light ray B1. The light rays B1 and B2 reach the polarization image sensor 12 through the first lens 32 of the lens assembly 14 and the polarizer assembly 16.

The polarizer assembly 16 is located at the position of the focal distance (focal plane) f of the first lens 32. Thus, the second light ray B2 (regular reflection light from the object point P) which is parallel to the optical axis C is made to form an image on the second polarizing optical element 24 which is located at the position of the focal distance f from the first lens 32 and is located on the optical axis C. The second light ray B2 is imaged by the polarization image sensor 12 through the second polarizing optical element 24 of the polarizing assembly 16.

On the other hand, the first light ray B1 passing through the first polarizing optical element 22 is scattered light. The first light ray B1 deviates from the focal position of the first lens 32 and passes through the first polarizing optical element 22 of the polarizer assembly 16. The first light ray B1 is imaged by the polarization image sensor 12 through the first polarizing optical element 22 of the polarizing assembly 16.

Thereby, the optical imaging apparatus 10 acquires a second captured image at the object point P by a telecentric optical system by the second light ray B2. The optical imaging apparatus 10 acquires a first captured image at the object point P by a telecentric optical system by the first light ray B1.

By using the first captured image and the second captured image, the optical imaging apparatus 10 can distinctly acquire the light ray B1 which emanates from the object point P in a direction that is not parallel to the optical axis C, and the light ray B2 which emanates from the object point P in a direction that is parallel to the optical axis C. Thereby, the optical imaging apparatus 10 can acquire information of scattering on the surface of the object 80. For example, when there is a flaw or the like on the surface of the object 80, regular reflection does not occur, and scattered light tends to easily occur. Thus, the acquisition of the first captured image and second captured image contributes to discovery of a flaw on the surface of the object 80.

According to the present embodiment, there can be provided an optical imaging apparatus 10 which can easily acquire a plurality of images at the same time or at once. According to this embodiment, there can be provided an optical imaging apparatus 10 which can acquire a plurality of images at the same time or at once by using a light flux from the same direction.

Fifth Embodiment

A fifth embodiment will be described with reference to FIG. 10 and FIG. 11. The present embodiment is a modification of the first to fourth embodiments. The same members as those described in the first to fourth embodiments are denoted by like reference signs, and a detailed description thereof is omitted.

Figure 10:
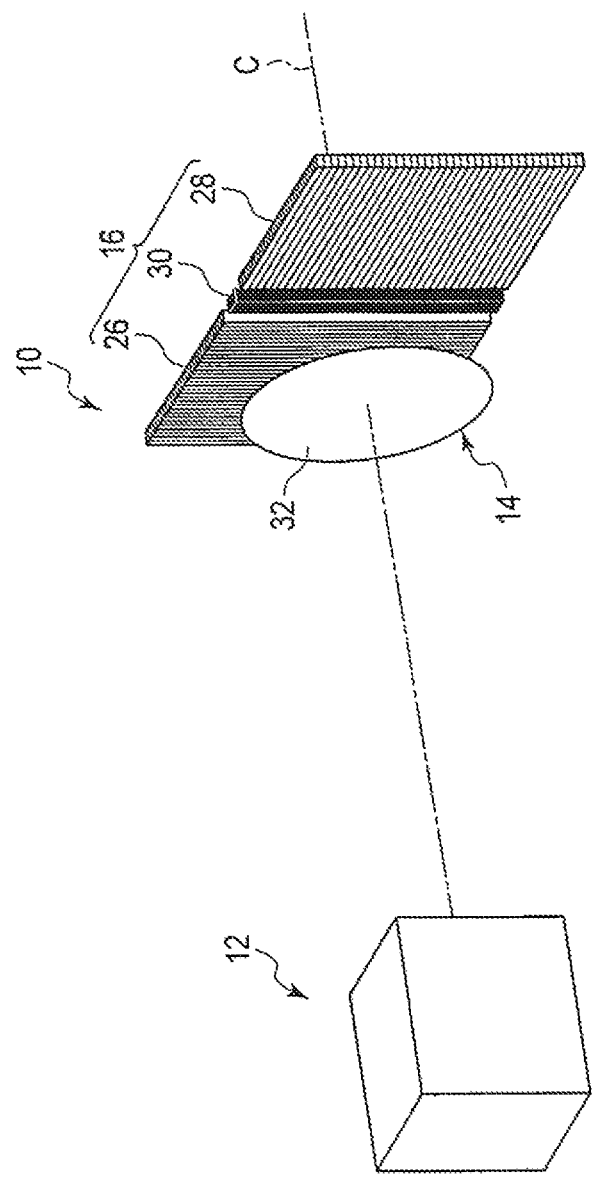
FIG. 10 is a schematic perspective view illustrating an optical imaging apparatus according to a fifth embodiment.
Figure 11:
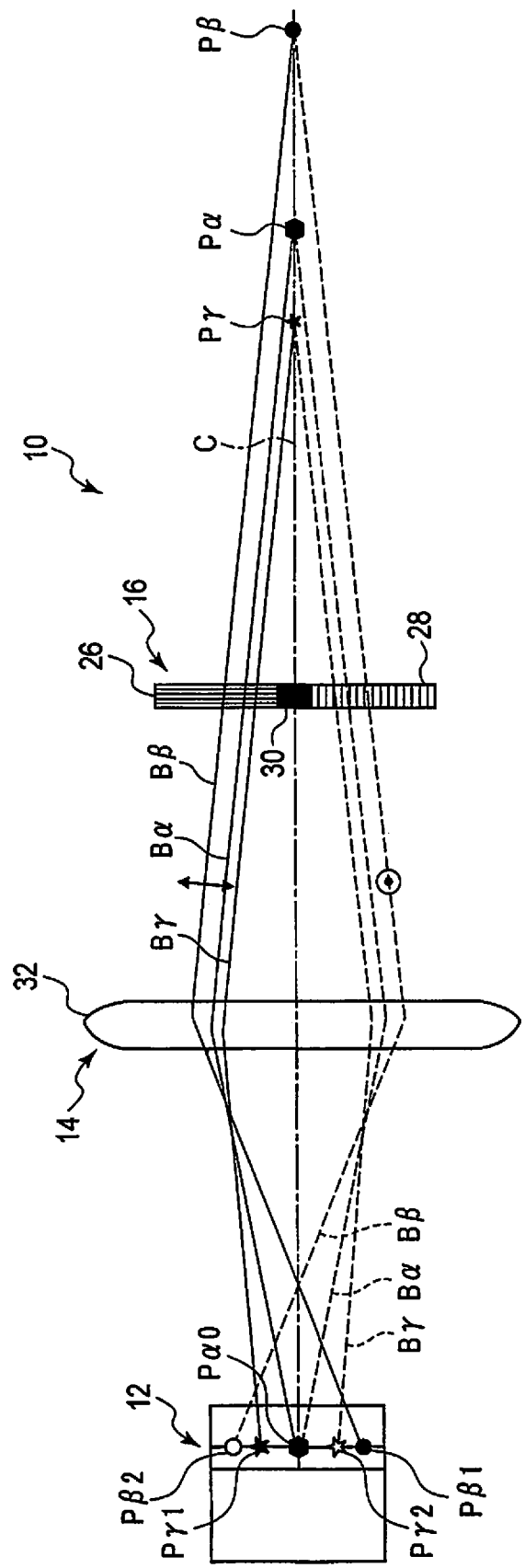
FIG. 11 is a schematic side view illustrating the optical imaging apparatus of FIG. 10.

As illustrated in FIG. 10 and FIG. 11, in the present embodiment, the lens assembly 14 is located between the polarization image sensor 12 and polarizer assembly 16.

The polarizer assembly 16 includes a first polarizing optical element 26 and a second polarizing optical element 28. The first polarizing optical element 26 and second polarizing optical element 28 neighbor each other, with the optical axis C being interposed. The polarizer assembly 16 includes a shield portion 30 between the first polarizing optical element 26 and second polarizing optical element 28. In the present embodiment, the first polarizing optical element 26 and second polarizing optical element 28 have substantially rectangular plate shapes. The shield portion 30 is located on the optical axis C.

The first polarizing optical element 26 transmits, for example, linearly polarized light of a polarization axis of 0°, which is included in natural light (light including components oscillating in all directions of 360°) passing through the first polarizing optical element 26. The second polarizing optical element 28 transmits, for example, linearly polarized light of a polarization axis of 90°, which is included in natural light (light including components oscillating in all directions of 360°) passing through the second polarizing optical element 28.

An operation of the optical imaging apparatus 10 according to the present embodiment will be described.

As illustrated in FIG. 11, a first object point Pα, a second object point Pβ, and a third object point Pγ on the optical axis C are imaged by the polarization image sensor 12.

An image of the first object point Pα is formed at the position Pα0 on the polarization image sensor 12. An image of the second object point Pβ is split into two positions Pβ1 and Pβ2 on the polarization image sensor 12. An image of the third object point Pγ is split into two positions Pγ1 and Pγ2 on the polarization image sensor 12.

A light ray Bβ from the second object point Pβ, which is farther than the first object point Pα, passes through the first polarizing optical element 26 and first lens 32, and is then made incident on a lower-side position Pβ1 of the polarization image sensor 12 with respect to the optical axis C. A light ray Bβ from the second object point Pβ passes through the second polarizing optical element 28 and first lens 32, and is then made incident on an upper-side position Pβ2 of the polarization image sensor 12 with respect to the optical axis C. Thus, the incidence positions with respect to the optical axis C of the light rays Bβ from the second object point Pβ, which is farther than the first object point Pα, are inverted on the polarization image sensor 12.

A light ray Bγ from the third object point Pγ, which is nearer than the first object point Pα, passes through the first polarizing optical element 26 and first lens 32, and is then made incident on an upper-side position Pγ1 of the polarization image sensor 12 with respect to the optical axis C. A light ray Bγ from the third object point Pγ passes through the second polarizing optical element 28 and first lens 32, and is then made incident on a lower-side position Pγ2 of the polarization image sensor 12 with respect to the optical axis C. Thus, the incidence positions with respect to the optical axis C of the light rays Bγ from the third object point Pγ, which is nearer than the first object point Pα, are not inverted on the polarization image sensor 12.

In this manner, the second object point Pβ, which is farther than the first object point Pα whose image is formed on the polarization image sensor 12, and the third object point Pγ, which is nearer than the first object point Pα, are different from each other with respect to the direction of slitting on the polarization image sensor 12 with respect to the optical axis C. Accordingly, the optical imaging apparatus 10 can judge whether a certain object point Pβ, Pγ, is nearer or farther than the first object point Pα, based on the positions Pβ1, Pβ2, Pγ1 and Pγ2 of incidence of light rays on the polarization image sensor 12 with respect to the optical axis C.

A distance between the first object point Pα and the second object point Pβ is calculated based on a distance between positions Pβ1 and Pβ2 of incidence (images) of the light rays Bβ from the second object point Pβ on the polarization image sensor 12. A distance between the first object point Pα and the third object point Pγ is calculated based on a distance between positions Pγ1 and Pγ2 of incidence (images) of the light rays Bγ from the third object point Pγ on the polarization image sensor 12.

Thereby, the optical imaging apparatus 10 can calculate an actual distance from the polarization image sensor 12 to the object point Pβ by detecting the distance between the split images Pβ1 and Pβ2 of the object point Pβ on the polarization image sensor 12 and the directions of deviation of the images from the optical axis C. Similarly, the optical imaging apparatus 10 can calculate an actual distance from the polarization image sensor 12 to the object point Pγ by detecting the distance between the split images Pγ1 and Pγ2 of the object point Pγ on the polarization image sensor 12 and the directions of deviation of the images from the optical axis C.

The shield portion 30 is inserted between the first polarizing optical element 26 and second polarizing optical element 28. Thus, the split of the object point Pβ, Pγ, becomes clearer.

According to the present embodiment, there can be provided an optical imaging apparatus 10 which can easily acquire a plurality of images at the same time or at once. According to this embodiment, there can be provided an optical imaging apparatus 10 which can acquire a plurality of images at the same time or at once by using a light flux from the same direction.

Sixth Embodiment

A sixth embodiment will be described with reference to FIG. 12 and FIG. 13. The present embodiment is a modification of the fifth embodiment. The same members as those described in the fifth embodiment are denoted by like reference signs, and a detailed description thereof is omitted.

Figure 12:
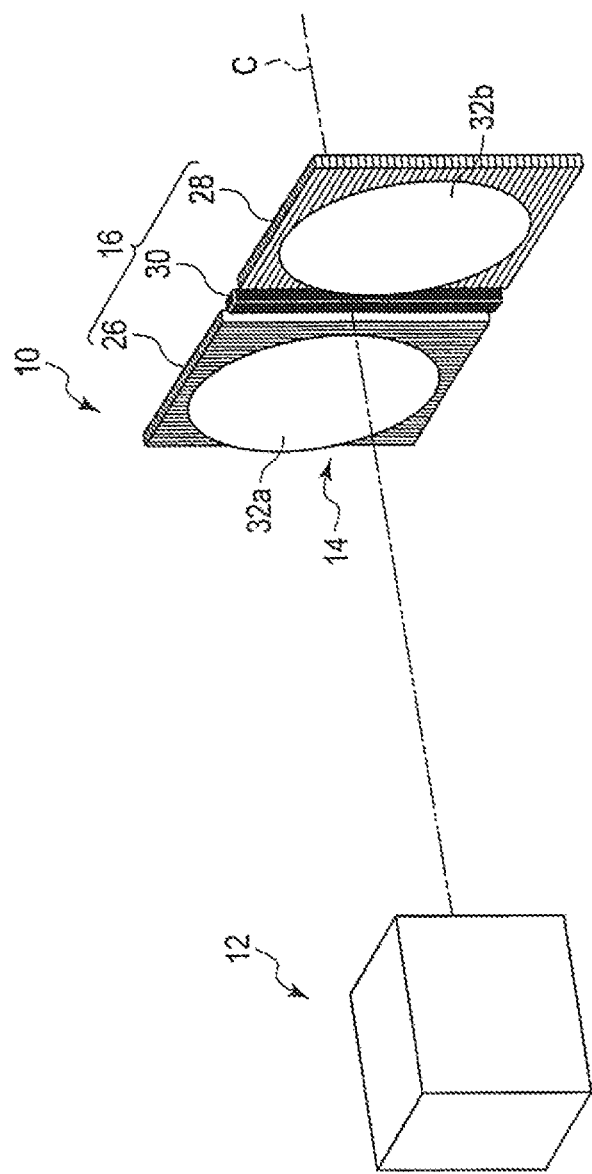
FIG. 12 is a schematic perspective view illustrating an optical imaging apparatus according to a sixth embodiment.
Figure 13:
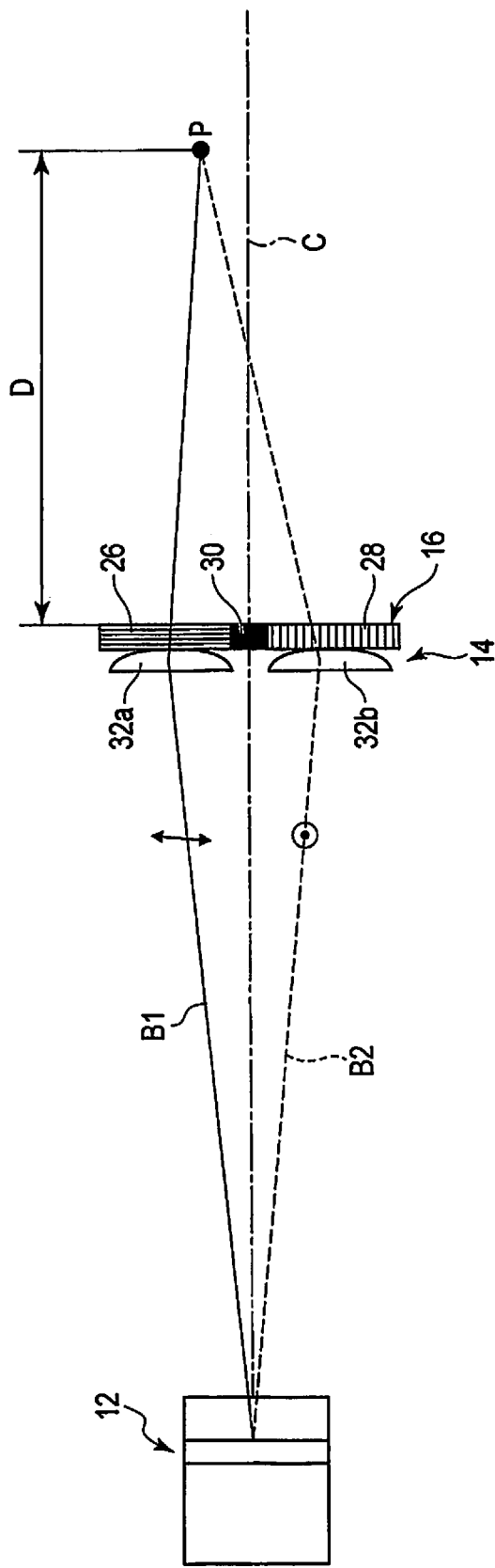
FIG. 13 is a schematic side view illustrating the optical imaging apparatus of FIG. 12.

As illustrated in FIG. 12 and FIG. 13, the lens assembly 14 includes two first lenses 32a and 32b.

The lens 32a is located between the first polarizing optical element 26 and polarization image sensor 12. The lens 32b is located between the second polarizing optical element 28 and polarization image sensor 12. The lenses 32a and 32b neighbor each other, with the optical axis C being interposed.

For example, with respect to the object point P, the polarization image sensor 12 simultaneously acquires an image of a first polarization component (e.g. a polarization axis of 0°), which passes through the first polarizing optical element 26 and lens 32a, and an image of a second polarization component (e.g. a polarization axis of 90°), which passes through the second polarizing optical element 28 and lens 32b. The two images are acquired by one polarization image sensor 12. This is the same as the case in which one image is an image of a left camera and the other image is an image of a right camera. Thus, the optical imaging apparatus 10 according to the present embodiment can be constituted as a stereo camera by using the two lenses 32a and 32b. A distance between the two lenses 32a and 32b is known. Accordingly, the optical imaging apparatus 10 can measure, for example, a distance D between the polarizer assembly 16 and the object point P.

According to the present embodiment, there can be provided an optical imaging apparatus 10 which can easily acquire a plurality of images at the same time or at once. According to this embodiment, there can be provided an optical imaging apparatus 10 which can acquire a plurality of images at the same time or at once by using a light flux from the same direction.

As regards the sixth embodiment, the varifocal lens denoted by reference sign 36 can be used in place of the lens 32a, 32b, as needed.

Seventh Embodiment

A seventh embodiment will be described with reference to FIG. 14. The present embodiment is a modification of the first to sixth embodiments. The same members as those described in the first to sixth embodiments are denoted by like reference signs, and a detailed description thereof is omitted.

Figure 14:
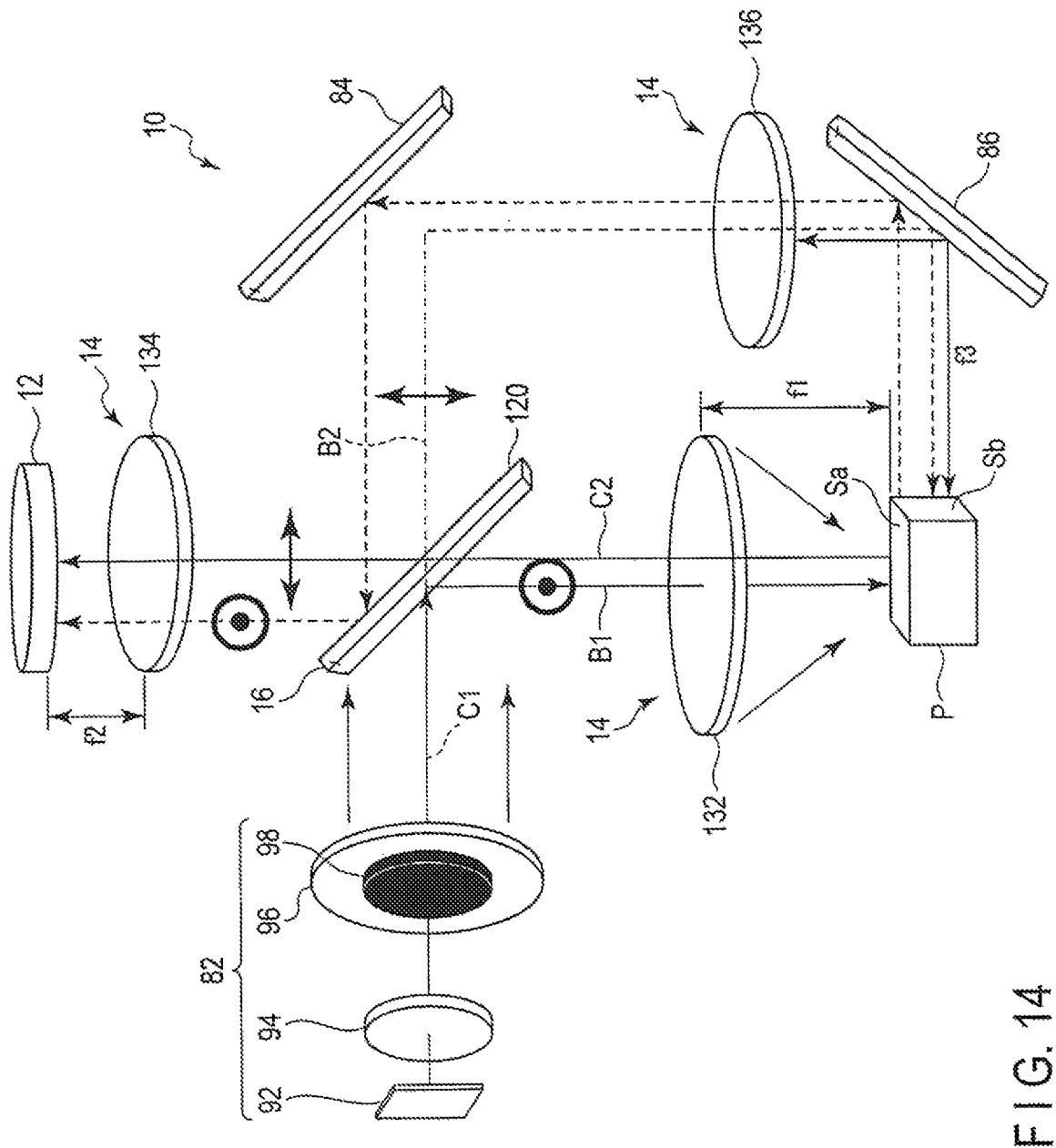
FIG. 14 is a schematic view illustrating an optical imaging apparatus according to a seventh embodiment.

As illustrated in FIG. 14, an optical imaging apparatus 10 according to the present embodiment includes a polarization image sensor (polarization camera) 12, a lens assembly 14, a polarizer assembly 16, a light source 82, and mirrors 84 and 86.

The polarizer assembly 16 is disposed on a front side (light emission side) of the light source 82. The polarizer assembly 16 includes a polarization beam splitter 120. The polarization beam splitter 120 acquires a first light ray B1 of a first polarization component and a second light ray B2 of a second polarization component from light from the light source 82, the light being used as a light flux from an identical direction.

The polarization beam splitter 120 is inclined to the optical axis C1 of the light source 82 by, for example, 45°. The polarization beam splitter 120 of the polarizer assembly 16 is located between a first lens 132 and a second lens 134 (to be described later) of the lens assembly 14. An optical axis C2 of the first lens 132 and second lens 134 of the lens assembly 14 is perpendicular to the optical axis C1 of the light source 82.

The lens assembly 14 includes a first lens (image formation lens) 132, a second lens (image formation lens) 134, and a third lens (image formation lens) 136. As regards the seventh embodiment, the varifocal lens denoted by reference sign 36 can be used in place of the lens 132, 134, 136, as needed.

The first lens 132 is located between the polarization beam splitter 120 and an observation target object P. A first surface Sa of the object P of the observation target exists on an optical path of light passing through the first lens 132. The first lens 132 is located at a distance of a focal distance f1 from the first surface Sa of the object P of the observation target.

The second lens 134 is located between the polarization beam splitter 120 and the polarization image sensor 12. The second lens 134 is located at a distance of a focal distance f2 from the polarization image sensor 12.

The mirror 84 is located on the optical axis C1 of the light source 82. The polarization beam splitter 120 is located between the mirror 84 and the light source 82. The mirror 84 reflects the light passing through the polarization beam splitter 120 in a direction of 90°. The third lens 136 and mirror 86 are located on an optical path of light reflected by the mirror 84. The mirror 86 reflects the light passing through the third lens 136 in a direction of 90°. A second surface Sb of the object P exists on an optical path of light reflected by the mirror 86. The third lens 136 is located at a distance (optical path length) of a focal distance f3 from the second surface Sb of the object P of the observation target.

The light source 82 includes a light-emitting element 92, a first lens 94 and a second lens 96. For example, an LED is used as the light-emitting element 92. The first lens 94 converts light emitted from the light-emitting element 92 to a parallel beam. A shield portion 98 is provided on a center axis of the second lens 96. The shield portion 98 has a discoidal shape. Thus, the second 96 convers the light from the light-emitting element 92 to light of a substantially donut-like shape. Note that the light from the light-emitting element 92 includes light oscillating in all directions (directions of 360°).

An operation of the optical imaging apparatus 10 according to the present embodiment will be described.

The light from the light-emitting element 92 of the light source 82 is converted to a parallel beam by the first lens 94, and the parallel beam is incident on the second lens 96. By the shield portion 98 of the second lens 96, the light from the light-emitting element 92 is incident on the polarization beam splitter 120 as the light of the donut-like shape. The polarization beam splitter 120 reflects S polarized light (first light ray B1) and transmits P polarized light (second light ray B2).

Of the light from the light source 82, the S polarized light reflected by the polarization beam splitter 120 is incident on the first surface Sa of the object P through the first lens 132. At this time, since the light from the light source 82 is made to have a donut-like shape by the shield portion 98 of the second lens 96, the S polarized light that is incident on the first surface Sa is made obliquely incident. The light that is made obliquely incident on the first surface Sa of the object P is scattered, and the polarization rotates. Of the light that is made obliquely incident on the first surface Sa, the polarization of a regular reflection component does not rotate. Thus, the light reflected from the first surface Sa of the object P includes S polarized light and P polarized light. The reflective light including the S polarized light and P polarized light is made incident on the polarization beam splitter 120 through the first lens 132. Of the light including the S polarized light and P polarized light, the polarization beam splitter 120 reflects the S polarized light and transmits the P polarized light. Thus, of the reflected light from the first surface Sa of the object P, the polarization beam splitter 120 reflects the S polarized light toward the light source 82 and transmits the P polarized light. The P polarization component that passes through the polarization beam splitter 120 is made incident on the polarization image sensor 12 through the second lens 134.

Of the light from the light source 82, the P polarized light that passes through the polarization beam splitter 120 is incident on the second surface Sb of the object P via the mirror 84, third lens 136 and mirror 86. At this time, since the light from the light source 82 is made to have a donut-like shape by the shield portion 98 of the second lens 96, the P polarized light that is incident on the second surface Sb is made obliquely incident. The light that is made obliquely incident on the second surface Sb of the object P is scattered, and the polarization rotates. Of the light that is made obliquely incident on the second surface Sb, the polarization of a regular reflection component does not rotate. Thus, the light reflected from the second surface Sb of the object P includes P polarized light and S polarized light. The reflective light including the P polarized light and S polarized light is made incident on the polarization beam splitter 120 via the mirror 86, third lens 136 and mirror 84. Of the light including the P polarized light and S polarized light, the polarization beam splitter 120 transmits the P polarized light and reflects the S polarized light. Thus, of the reflective light from the second surface Sb of the object P, the polarization beam splitter 120 transmits the P polarized light toward the light source 82 and reflects the S polarized light. The S polarization component reflected by the polarization beam splitter 120 is made incident on the polarization image sensor 12 through the second lens 134.

Accordingly, the light from the first surface Sa of the object P is made incident on the polarization image sensor 12 as the P polarization component. The light from the second surface Sb of the object P is made incident on the polarization image sensor 12 as the S polarization component. Thus, the optical imaging apparatus 10 acquires, by the polarization image sensor 12, two images of the P polarization component from the first surface Sa of the object P and the S polarization component from the second surface Sb of the object P. In this manner, by the polarization image sensor 12, the optical imaging apparatus 10 acquires images from two view points at the same time or at once. By utilizing this, the optical imaging apparatus 10 can acquire only scattered light.

According to the present embodiment, there can be provided an optical imaging apparatus 10 which can easily acquire a plurality of images at the same time or at once. According to this embodiment, there can be provided an optical imaging apparatus 10 which can acquire a plurality of images at the same time or at once by using a light flux from the same direction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical imaging apparatus comprising:
   a polarizer assembly configured to acquire a first light ray of a first polarization component and a second light ray of a second polarization component which is different from the first polarization component, by using a light flux from an identical direction;
   a polarization image sensor located in a position facing the polarizer assembly, and configured to acquire an image of the first polarization component and an image of the second polarization component at once or at the same time; and
   a lens assembly including a first lens configured to form the images on the polarization image sensor,
   wherein:
   the polarizer assembly includes:
      a first polarizing optical element configured to acquire the first light ray of the first polarization component from a first object point located on a far-side with respect to the optical imaging apparatus; and
      a second polarizing optical element configured to acquire the second light ray of the second polarization component from a second object point located on a nearside with respect to the optical imaging apparatus than the first object point, and wherein:
   the first polarizing optical element and the second polarizing optical element neighbor each other,
   the second polarizing optical element is disposed inside the first polarizing optical element,
   the first polarizing optical element and the second polarizing optical element are concentric, and each formed of a single type,
   the first polarizing optical element and the second polarizing optical element have flat plate shapes,
   the first lens is located in front of the polarization image sensor and is configured to form the image of the first light ray,
   the lens assembly includes a second lens located in front of the polarization image sensor,
   the first lens and the second lens are configured to form the image of the second light ray by combining the two lenses,
   the lens assembly is configured to simultaneously form the images from the first and second object points on the polarization image sensor, and
   when an object is located on the far-side with respect to the first object point, the optical imaging apparatus is configured to judge the object, based on the image of the first polarization component, and
   when the object is located between the first object point and the second object point, the optical imaging apparatus is configured to judge the object, based on the image of the second polarization component.

2. The optical imaging apparatus of claim 1, wherein the polarizer assembly includes a shield portion between the first polarizing optical element and the second polarizing optical element.

3. The optical imaging apparatus of claim 1, wherein the lens assembly includes a third lens with an annular shape, which is disposed around an outer periphery of the second lens, is located between the first polarizing optical element and the first lens, and is configured to transmit the first light ray.

4. The optical imaging apparatus of claim 1, wherein the first lens is located farther than the polarizer assembly from the polarization image sensor, and
   the polarizer assembly is located at the focus plane of the first lens.

5. The optical imaging apparatus of claim 4, wherein the polarizer assembly is located between the first lens and the polarization image sensor.

6. The optical imaging apparatus of claim 1, wherein
   the first lens is located between the polarizer assembly and the polarization image sensor, and
   the first polarizing optical element and the second polarizing optical element are located to neighbor each other, with an optical axis of the polarization image sensor being interposed.

7. The optical imaging apparatus of claim 6, wherein the first lens is located on the optical axis of the polarization image sensor.

8. The optical imaging apparatus of claim 6, wherein
   the first lens is located between the first polarizing optical element and the polarization image sensor,
   the second lens is located between the second polarizing optical element and the polarization image sensor, and
   the first lens and the second lens neighbor each other, with the optical axis of the polarization image sensor being interposed.

9. The optical imaging apparatus of claim 1, wherein the first lens is a varifocal lens.

10. The optical imaging apparatus of claim 1, further comprising a light source,
    wherein the polarizer assembly includes a polarization beam splitter configured to acquire the first light ray of the first polarization component and the second light ray of the second polarization component from light from the light source, the light being as the light flux from the identical direction.

11. A robot hand comprising the optical imaging apparatus of claim 1.

12. A moving body comprising the optical imaging apparatus of claim 1.

13. A LiDAR apparatus comprising the optical imaging apparatus of claim 1.

14. An optical imaging apparatus comprising:
    a polarizer assembly configured to acquire a first light ray of a first polarization component and a second light ray of a second polarization component which is different from the first polarization component, by using a light flux from an identical direction, the polarizer assembly including:
- a first polarizing optical element configured to acquire the first light ray of the first polarization component from a first object point located on a far-side with respect to the optical imaging apparatus; and
- a second polarizing optical element configured to acquire the second light ray of the second polarization component from a second object point located on a near-side with respect to the optical imaging apparatus than the first object point,
- the first polarizing optical element and the second polarizing optical element neighbor each other,
- the second polarizing optical element being disposed inside the first polarizing optical element,
- the first polarizing optical element and the second polarizing optical element being concentric, and each formed of a single type;
- a polarization image sensor located in a position facing the polarizer assembly, and configured to acquire an image of the first polarization component and an image of the second polarization component at once or at the same time; and
- a lens assembly including a first lens which is located in front of the polarization image sensor and is configured to simultaneously form the images of the first and second polarization components from the first and second object points on the polarization image sensor, wherein:
- when an object is located on the far-side with respect to the first object point, the optical imaging apparatus is configured to judge the object, based on the image of the first polarization component, and
- when the object is located between the first object point and the second object point, the optical imaging apparatus is configured to judge the object, based on the image of the second polarization component.

\* \* \* \* \*